(12) United States Patent
Lubman et al.

(10) Patent No.: US 7,610,768 B2
(45) Date of Patent: Nov. 3, 2009

(54) APPARATUS AND METHODS FOR WATER REGENERATION FROM WASTE

(75) Inventors: Alex M. Lubman, Redondo Beach, CA (US); Allen K. MacKnight, Signal Hill, CA (US); Volodimir G. Rifert, Kiev (UA); Ivan V. Zolotukhin, Kiev (UA); Vladimir I. Usenko, Kiev (UA); Petr A. Barabash, Kiev (UA); Aleksandr P. Strikun, Kiev (UA)

(73) Assignee: Honeywell International Inc., Morristown, NJ (US)

( * ) Notice: Subject to any disclaimer, the term of this patent is extended or adjusted under 35 U.S.C. 154(b) by 708 days.

(21) Appl. No.: 11/271,674

(22) Filed: Nov. 9, 2005

(65) Prior Publication Data

US 2007/0102276 A1     May 10, 2007

(51) Int. Cl.
*F25B 27/00* (2006.01)
*B01D 3/14* (2006.01)
*B01D 3/10* (2006.01)
*B01D 3/08* (2006.01)

(52) U.S. Cl. ............... 62/238.6; 202/238; 202/155; 202/205

(58) Field of Classification Search ........... 202/238, 202/155, 176, 197, 200, 202, 205; 203/10, 203/91; 62/238.1, 238.6, 91; 277/427
See application file for complete search history.

(56) References Cited

U.S. PATENT DOCUMENTS

| | | | |
|---|---|---|---|
| 3,091,469 A | * | 5/1963 | Matt ..................... 277/301 |
| 4,316,774 A | | 2/1982 | Trusch |
| 4,902,197 A | * | 2/1990 | Rhodes et al. ............. 415/111 |
| 6,258,215 B1 | * | 7/2001 | Samsonov et al. .......... 202/176 |
| 6,649,027 B1 | | 11/2003 | MacKnight et al. |
| 6,695,951 B1 | * | 2/2004 | Bitterly et al. ............. 202/182 |
| 6,802,941 B2 | * | 10/2004 | Zebuhr ..................... 202/155 |

OTHER PUBLICATIONS

Clark, R.L. & Bromley, "Saline Water Conversion by Multiple-effect Rotating Evaporator", L. A., (1961) *Chem. Eng. Prog.*, v. 57, pp. 64-70.

(Continued)

*Primary Examiner*—William C Doerrler
(74) *Attorney, Agent, or Firm*—Oral Caglar, Esq.

(57) ABSTRACT

A rotary multi-stage distiller for recovery of water from wastewater is provided. The rotary multi-stage distiller of the present invention can recover water from a wide variety of aqueous wastewaters such as, but not limited to, urine, condensate from air conditioning systems, wash water containing foaming soaps, seawater or polluted water. The multi-stage distiller can operate under vacuum conditions permitting the distillation to occur at low temperatures. The multi-stage distiller uses centrifugal forces for fluid pumping and for vapor/liquid separation. The multi-stage distiller comprises hydraulic seals for each stage which eliminate contamination of clean, recovered water by condensed waste water during the regeneration process. The multi-stage distiller also comprises a stationary shaft of stacked segments where each segment is associated with an individual stage of the multi-stage distiller. The number of stages therefore, of the multi-stage distiller of the present invention can be readily adjusted as needed by either adding a segment with a stage to the stationary shaft or removing a segment of the shaft with a stage to decrease the number of stages.

25 Claims, 7 Drawing Sheets

OTHER PUBLICATIONS

Rifert, V. et al. "Comparison of Secondary Water Processors Using Distillation for Space Applications," SAE Paper 1999-01-1991, 29th Int. Conf. On Environmental Systems, Jul. 1999.

MacKnight, A. et al. "Performance Evaluation of a Three-Stage Vacuum Rotary Distillation Processor," SAE Paper 2000-01-2386, 30th Int. Conf. On Environmental Systems and 7th European Symp. On Space Environmental Control Systems, Jul. 2000.

Rifert, V. et al. "Design Optimization of Cascade Rotary Distiller with the Heat Pump for Water Reclamation from Urine," SAE Paper 2001-01-2248, 31st Int. Conf. On Environmental Systems, Jul. 2001.

Rifert, V. et al. "Cascaded Distillation Technology for Water Processing in Space," SAE Paper 2003-01-2625, 33rd Int. Conf. on Environmental Systems, Jul. 2003.

* cited by examiner

APPARATUS AND METHODS FOR WATER REGENERATION FROM WASTE

BACKGROUND OF THE INVENTION

The present invention relates generally to water regeneration or recovery from wastewater and more particularly, to water regeneration by cascade distillation.

One of the most important resources for human support is potable water. Since fresh potable water cannot be supplied for long duration space missions recovery of wastewater is essential. Wastewater generally consists of urine, hygiene water, and humidity condensate. A wastewater processing system converts the wastewater to potable water fit for long-term human consumption. The reliable and effective operation of the wastewater processing system is a major consideration for design and operation of the life support system. The important features of a wastewater processing system are potable water quality, water processing rate, water recovery efficiency, specific energy consumption, consumable use, and installed size and weight.

The water processing system for use on spacecraft is complex and usually consists of a number of components including pumps, tanks and controls. Wastewater is purified in a primary processor followed by a secondary processor and finally a water polisher to insure that the water quality is at spacecraft potable standard. Water processing systems using a number of different technologies have been developed or are under investigation.

One important technology is the use of distillation. As an element in a complete water recovery system distillation units are used to recover water from urine and brines. Water processing systems must have a function to remove mineral salts. Wastewater, especially human urine, contains mineral salts that must be removed if the recycled water is to become potable. The result of distillation is purified water and concentrated brine.

Vacuum rotary distillation processors compare favorably with other distillation processors for use in spacecraft water processing systems. Vacuum distillation technology has been in development for over 26 years. Excellent performance of this technology for urine processing has previously been demonstrated. U.S. Pat. No. 6,258,215 describes a system including rotary multi-stage vacuum distiller for recovering water from urine. However the rotary distiller of the '215 patent has insufficient construction seals so that there is a high risk of contamination of product water by wastewater. Moreover, the '215 patent only describes a system to be used in microgravity and only for recovering water from urine to the exclusion of other aqueous waste.

U.S. Pat. No. 6,695,051 describes the use of vapor compression distillation for the production of water from wastewater. Vapor compression distillation requires a steam compressor and the boiling of the liquids. With wastewater having a high mineral and salt content, such as urine, the boiling of the liquid leaves mineral and salt deposits on the apparatus, resulting in decreased lifetime of the apparatus. Vapor compression distillation also uses a significantly higher amount of energy per kg of water produced.

As can be seen, there is a need for an apparatus and method for producing water from wastewater, especially urine, which is lightweight, uses a minimal amount of energy and limits the cross-contamination of the wastewater with the purified water.

SUMMARY OF THE INVENTION

In one aspect of the present invention there is provided a cascade distiller comprising a housing; a cylindrical rotor cover disposed within the housing; a stationary shaft disposed within the cylindrical rotor cover, the stationary shaft comprising individual shaft sections wherein each shaft section comprises a stage of the multi-stage vacuum distiller; and wherein each stage comprises heat exchange surfaces, partitions, an evaporation zone and a condensation zone.

In another aspect of the present invention there is provided a cascade distiller comprising a cylindrical rotor cover; a plurality of cascade stages disposed within the cylindrical rotor cover; and at least one hydraulic seal between two adjoining stages, wherein the hydraulic seal comprises a fluid.

In a further aspect of the present invention there is provided a cascade distiller comprising a cylindrical rotor cover; a plurality of cascade stages disposed sequentially within the cylindrical rotor cover with a first cascade stage and a last cascade stage, wherein neighboring cascade stages are in fluid communication; and a product condensation chamber, the product condensation chamber being in fluid communication with the last cascade stage, wherein the product condensation chamber comprises a first Pitot pump for pumping a condensate from the product condensation chamber to a condensation circulation loop and a second Pitot pump for pumping excess condensate to a distillate product effluent line.

These and other features, aspects and advantages of the present invention will become better understood with reference to the following drawings, description and claims.

DETAILED DESCRIPTION OF THE INVENTION

Figure 1:
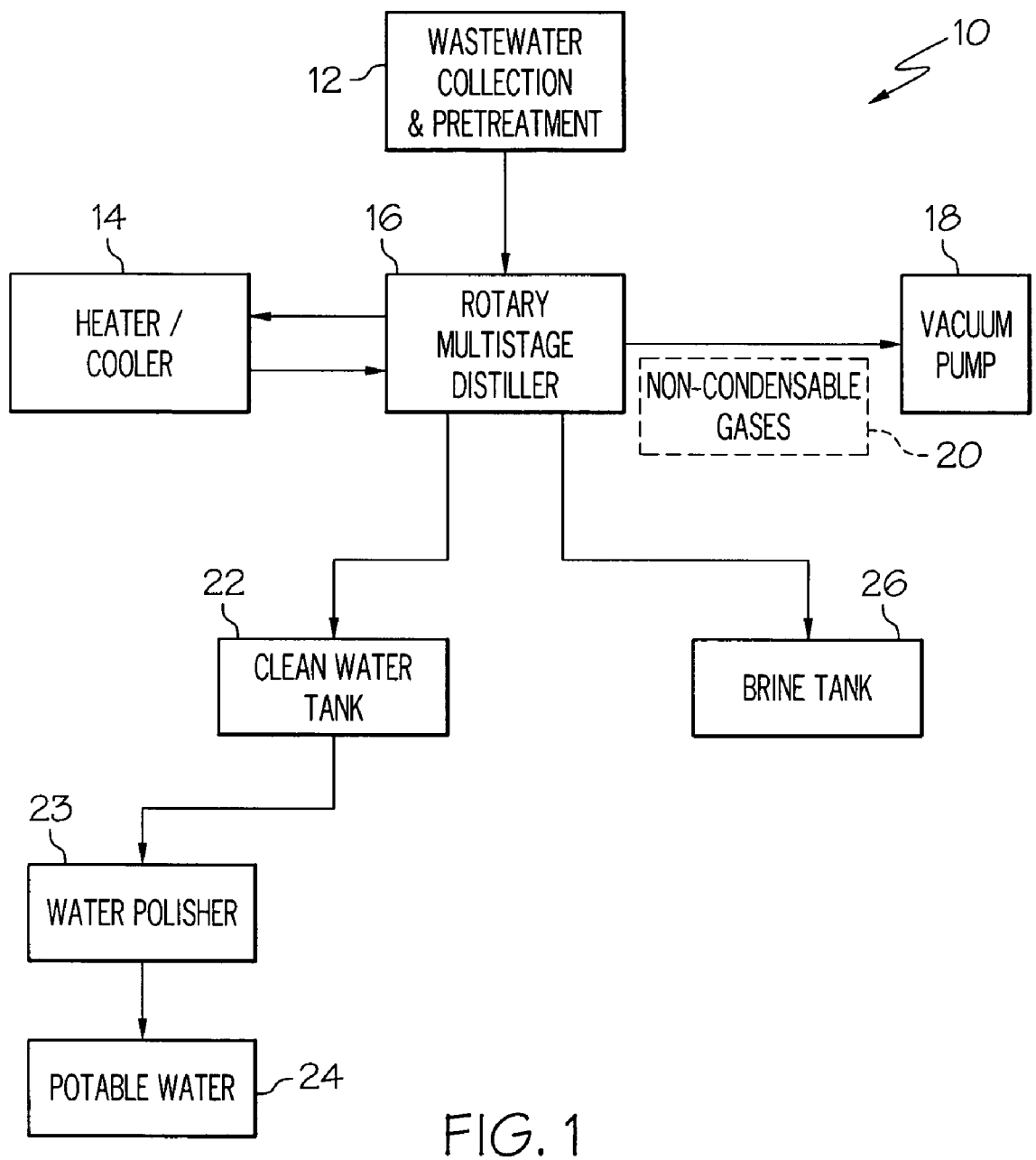
FIG. 1 is a general schematic view of a system for water recovery from wastewater, according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an apparatus and system for efficient water regeneration from aqueous waste as well as methods for using the apparatus. The apparatus and system may allow for water regeneration from aqueous waste from a variety of different sources by cascade distillation with an improved multi-stage distiller. The multi-stage distiller of the present invention may recover water from a wide variety of aqueous wastewaters such as, but not limited to, urine, condensate from air conditioning systems, wash water containing foaming soaps, seawater or polluted water. The multi-stage distiller of the present invention may also concentrate industrial streams of wastewater with the purpose of recovery of special metal, salts, chemicals compounds, ions and unique chemical solutions. The present invention may be useful in applications and situations where sources of clean water may be either limited or unavailable in either a terrestrial, marine or space environment under conditions of microgravity, vacuum, atmospheric pressure and overpressure. Non-limiting examples may be a space station, an underground bunker or a sea-going or submersible vessel.

The efficacy of regeneration of water from aqueous waste by the apparatus of the present invention may be due to the novel design of a multi-stage distiller for cascade distillation. The multi-stage distiller of the present invention may use centrifugal forces for fluid pumping and for vapor/liquid separation. The multi-stage distiller may comprise hydraulic seals for each stage which eliminate contamination of clean, recovered water by condensed waste water during the regeneration process. This may be particularly important when the unit is stopped. Without the seals, the differential pressure in each stage may cause cross-contamination of the clean, recovered water and the condensed aqueous waste. The hydraulic seals may also allow the present invention to be used in both microgravity and earth's gravity. The multi-stage distiller may also comprise a stationary shaft of stacked segments where each segment is associated with an individual stage of the multi-stage distiller. The number of stages therefore, of the multi-stage distiller of the present invention may readily be adjusted as needed by either adding a segment with a stage to the stationary shaft or removing a segment of the shaft with a stage to decrease the number of stages. In contrast, the distillers of the prior art have single piece, solid shafts that do not allow for a flexible arrangement of the individual stages. Moreover, the multi-stage distillers of the prior art do not have seals that prevent contamination of clean, recovered water, particularly when the unit is stopped under normal gravitational conditions.

Illustrated in FIG. 1 is a basic water regeneration system 10 for recovering clean water from wastewater. Water regeneration system 10 may comprise a wastewater collection and pretreatment unit 12 for collecting wastewater and, if desired, pre-treating the collected wastewater. Non-limiting examples of pretreatment may be the addition of an anti-foaming agent to prevent excessive foaming of the wastewater during the recovery process or preservation of urine by treatment with oxidizing agents such as, but not limited to, sodium persulfate. Water regeneration system may further comprise a heating/cooling element 14 for heating the wastewater and cooling the distillate, a rotary multi-stage vacuum distiller 16 for separating clean water from contaminants in the wastewater and a condensate holding tank 22 for storing the clean water from the multi-stage vacuum distiller 16. It should be noted that the terms "condensate" and "distillate" may be used interchangeably to describe the clean water recovered from the wastewater during distillation. As the wastewater is distilled, it moves through individual stages of the multi-stage vacuum distiller. Distillate is produced in the rotary multi-stage vacuum distiller 16 by condensing steam with water circulated through the cooler. The distillate water is combined with the cooling water and becomes product clean water. Alternatively, wastewater may be pumped to heating/cooling element 14 to be reheated and processed again. When most of water has been removed from the wastewater, the concentrated brine 26 is removed. Non-condensable gases 20 may be removed from multi-stage vacuum distiller 16 by a vacuum pump 18. Finally, the clean water in the condensate holding tank may be further purified, if necessary, in a water polisher 23 to produce potable water 24.

Figure 2:
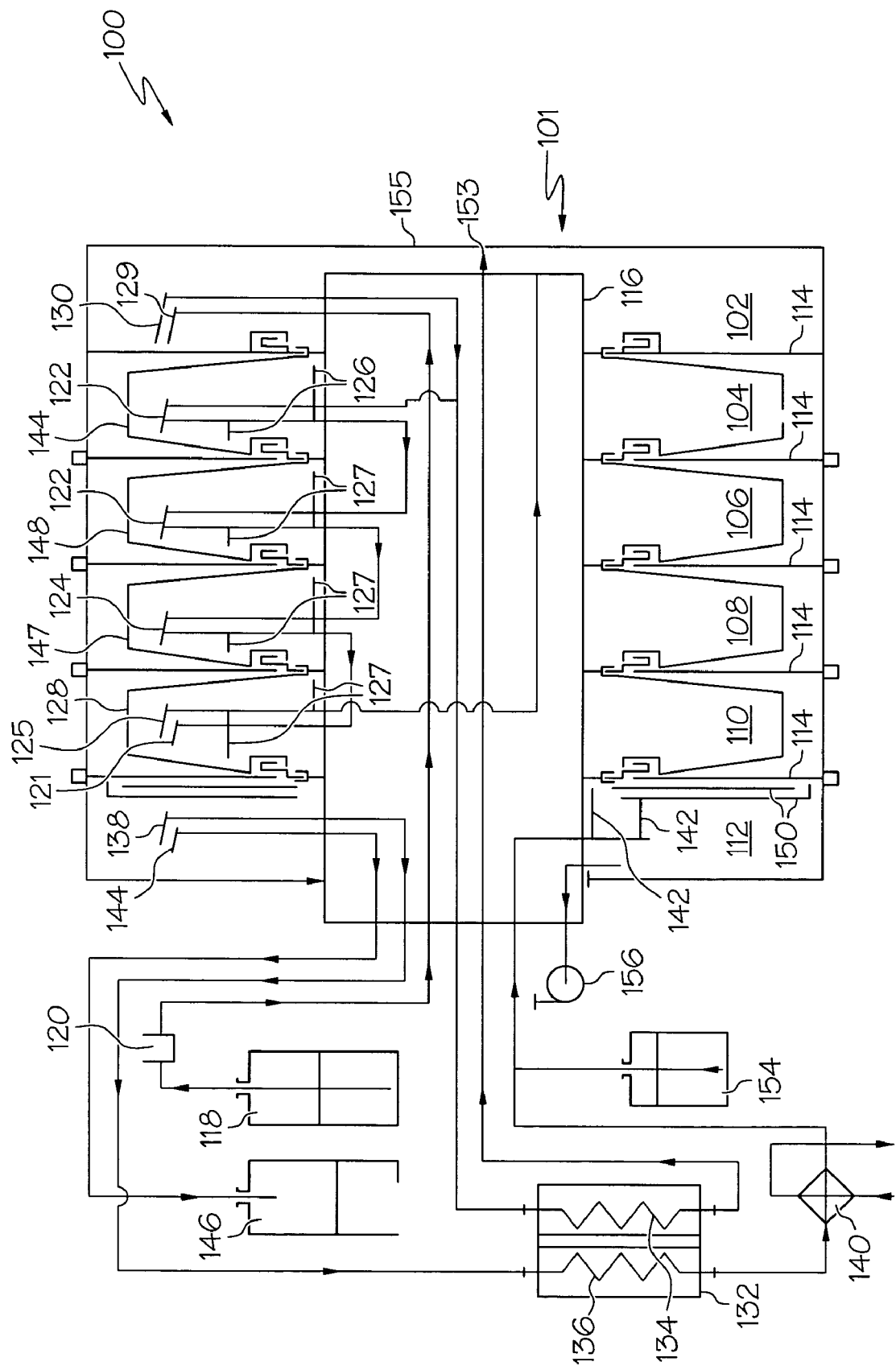
FIG. 2 is a schematic view of a rotary 5-stage vacuum distiller, according to the present invention.

A simplified schematic of a rotary five-stage vacuum distiller 100 is shown in FIG. 2. Five-stage vacuum distiller 100 may comprise a rotor assembly 101 where evaporation and condensation during the distillation process occurs and a stationary shaft 116 through which warmed wastewater and cooled distillate are circulated to and from rotor assembly 101. Rotor assembly 101 may be subdivided by partitions 114 into five distillation stages: first distillation stage 102, second distillation stage 104, third distillation stage 106, fourth distillation stage 108 and fifth distillation stage 110. Rotor assembly 101 may further comprise a final condenser 112 after fifth distillation stage 110 to condense any remaining water vapor.

Stationary shaft 116 may comprise Pitot pumps 122, 123, 124, 125. Second stage Pitot pump 122, third stage Pitot pump 123, fourth stage Pitot pump 124 and fifth stage Pitot pump 125 may provide communication between first 102, second 104, third 106, fourth 108 and fifth 110 distillation stages, respectively, and external connections. Pitot pumps 122, 123, 124, 125 may be used to pump process brine between distillation stages 102, 104, 106, 108 and 110. Rotor assembly 101 may further comprise a brine-out Pitot pump 130 in first distillation stage 102, where brine out Pitot pump 130 may circulate the brine to a thermoelectric heat pump 132 and/or second distillation stage 104. Rotor assembly 101 may also comprise condensate circulating Pitot pump 138 and condensate product Pitot pump 144 in final condenser 112 where condensate circulating Pitot pump 138 may circulate condensate to a cooler 140 and condensate product Pitot pump 144 may pump condensate product to a condensate product tank 146. Pitot pumps 122, 123, 124, 125, 130, 138, 144 may be part of stationary shaft 116 and may not move. The dynamic pressure head induced by the centrifugal forces from the rotating rotor assembly 101 creates pressure for the fluid transport through five-stage vacuum distiller 100. The advantage gained by employing Pitot pumps 122, 123, 124, 125, 130, 138, 144 may be that the five-stage vacuum distiller 100 may not require any external pumps for fluid transport.

Clean water may be recovered from wastewater by distillation when rotor assembly 101 is rotating. A vacuum pump 156 may evacuate air from five-stage vacuum distiller 100 and maintain a desired pressure. In one exemplary embodiment, the pressure may be from about 4.74 kPa to about 9.55 kPa. It will be appreciated however, that the pressure of five-stage vacuum distiller 100 may depend on external conditions as well as the number of stages in the vacuum distiller. The skilled artisan may be able to determine the optimal operating pressure without undue experimentation. During normal operation of vacuum distiller 100 vacuum pump 122 may not operate and only may be used during startup when the vacuum distiller 100 is hermetically sealed. The vacuum pressure may permit distillation at temperatures of from about 32° C. to about 45° C.

The wastewater may be stored in a process fluid feed tank 118 and may flow from process fluid feed tank 118 through a feed control valve 120 to the first distillation stage 102 using a first stage feed Pitot pump 129. There may be a pressure difference between wastewater tank 118 at an ambient pressure and vacuum distiller 100 so no pump may be needed. The wastewater may form a ring of fluid at the periphery of rotor assembly 101 due to the centrifugal forces. When the depth of the fluid ring reaches the level of the brine out Pitot pump 130 nozzle it may be pumped to the second distillation stage 104. Before the wastewater reaches the next distillation stage, part of it may be sprayed through a second stage spray head 126 onto a first heat transfer surface 149. Once in the second distillation stage 104, the wastewater may form a ring of fluid as in first distillation stage 102. The wastewater may continue to flow through rotor assembly 101 from distillation stage to distillation stage in a similar manner as between the first 102 and second 104 distillation stages. Process brine water may be introduced into fifth distillation stage 110 through a feed Pitot pump 121. At each distillation stage some of the wastewater may be sprayed onto a first 149, second 148, third 147 or fourth 128 heat transfer surface through spray heads 127, where first 149, second 148, third 147 and fourth 128 heat transfer surfaces correspond to second 104, third 106, fourth 108 and fifth 110 distillation stages, respectively. At the end of this process, the remaining brine water may be returned to the first distillation stage 102. This circulation through all of the distillation stages may provide for parallel distillation from each stage and may lead to greater production rate of distilled water.

When the wastewater reaches first distillation stage 102 it may be pumped out of the rotor assembly 101 by brine out Pitot pump 130. This wastewater may then circulate through a heating side 134 of a thermoelectric heat pump 132. Although a thermoelectric heat pump 132 is used herein as an example, it will be appreciated that other sources of heat and/or cooling may be used such as, but not limited to, waste heat, an electrical heater, a fuel heater, solar heat, refrigeration cooling, evaporative cooling, heat sink cooling, ambient air or sea or lake water cooling, and radiative cooling. After being heated, the wastewater may return to the rotor assembly 101 where it enters first distillation stage 102 and may then be sprayed from first stage spray head 153 on to an evaporating surface 155.

The following is a simplified description of both the apparatus and the process for water regeneration from wastewater. A more detailed description is given in the discussion of FIGS. 3-6.

During normal operation of five-stage vacuum distiller 100, heated wastewater may be sprayed into first distillation stage 102. The superheated wastewater may be cooled by evaporation into steam as first distillation stage 102 is at a low pressure. The steam formed in first distillation stage 102 may pass through a vapor separator 158 to remove droplets and may be condensed on first heat transfer surface 149 of second distillation stage 104. The cooler condensate of second distillation stage 104 may act as the coolant for condensing the steam of first distillation stage 102. The heat released during the condensation of the steam on first heat transfer surface 149 may induce evaporation of a portion of the wastewater in second distillation stage 104. The formed steam may then be condensed on second heat transfer surface 148 of third distillation stage 106. This process of evaporation and condensation may be repeated twice more in fourth 108 and fifth 110 distillation stages. The steam from fifth distillation stage 110 may be condensed in final condenser 112 on condenser heat transfer surface 150. Condenser heat transfer surface 150 may be cooled by circulating distillate and therefore, there may be no subsequent evaporation. While not wishing to be bound by theory, the efficacy of vacuum distiller 100 of the present invention may be due to the recuperation of the energy of evaporation of the wastewater in first distillation stage 102 four times to be reused in second 104, third 106, fourth 108 and fifth 110 distillation stages.

The condensate which may be formed in the condensation zones of all five stages may be collected on the peripheries of each stage and is moved by centrifugal forces from stage to stage through water seals 152. The condensate may then be collected in the final condenser 112 and mixed with cold circulating distillate. Excess distillate in pumped by condensate product Pitot pump 144 to a condensate product tank 146.

The condensate may be circulated to cool condenser heat transfer surface 150 of final condenser 112. The condensate is pumped from final condenser 112 by condensate circulating Pitot pump 138 through a cooling side 136 of thermoelectric heat pump 132, cooler 140 and finally condensate spray heads 142 in final condenser 112. Clean water may be stored in distillate fill tank 154. The distillate fill tank 154 may be used during startup to feed clean water into the system to assure sufficient cooling of condenser heat transfer surface 150.

Figure 3A:
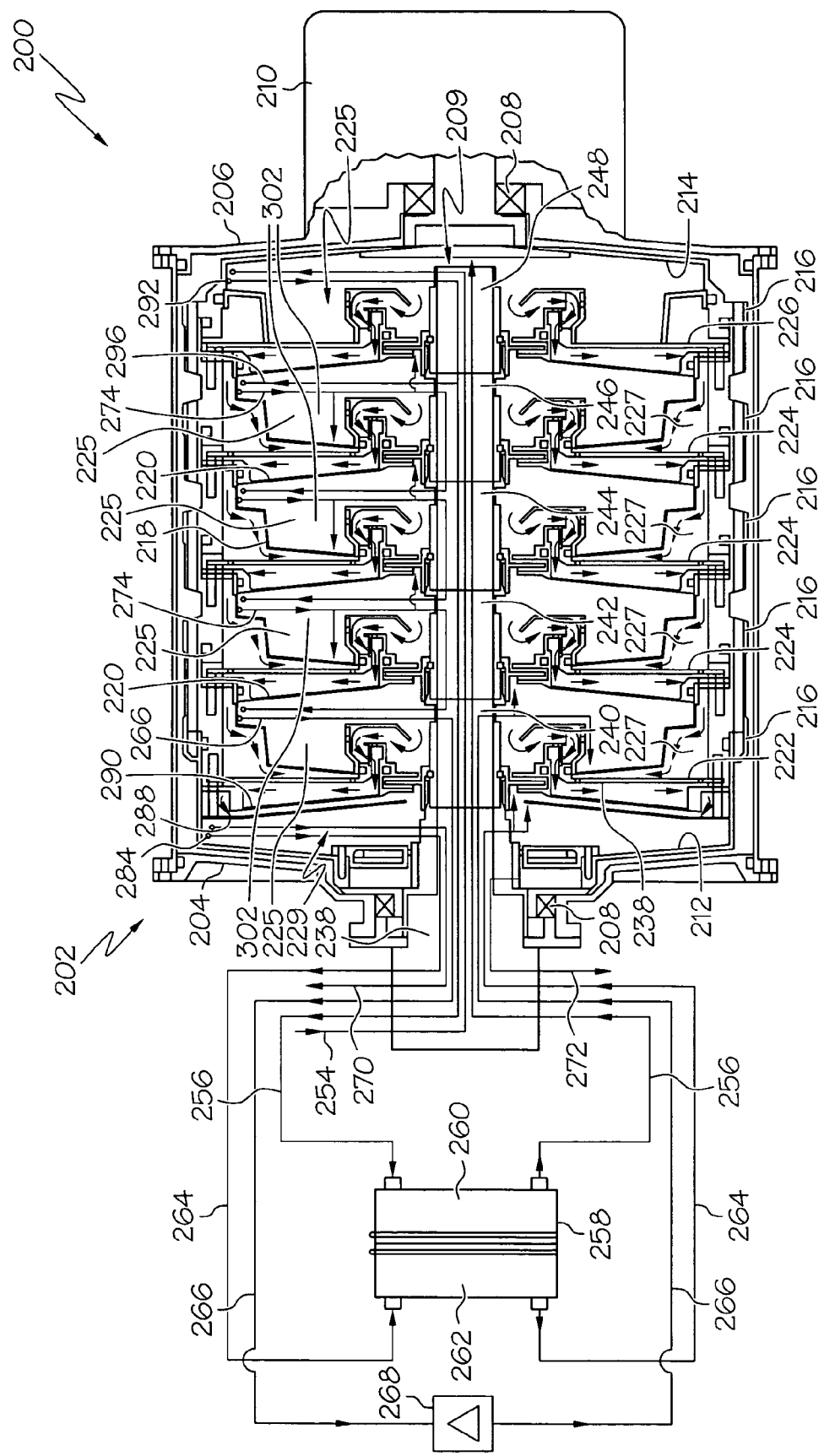
FIG. 3A is a cross-sectional view of a rotary 5-stage vacuum distiller, according to the present invention.
Figure 3B:
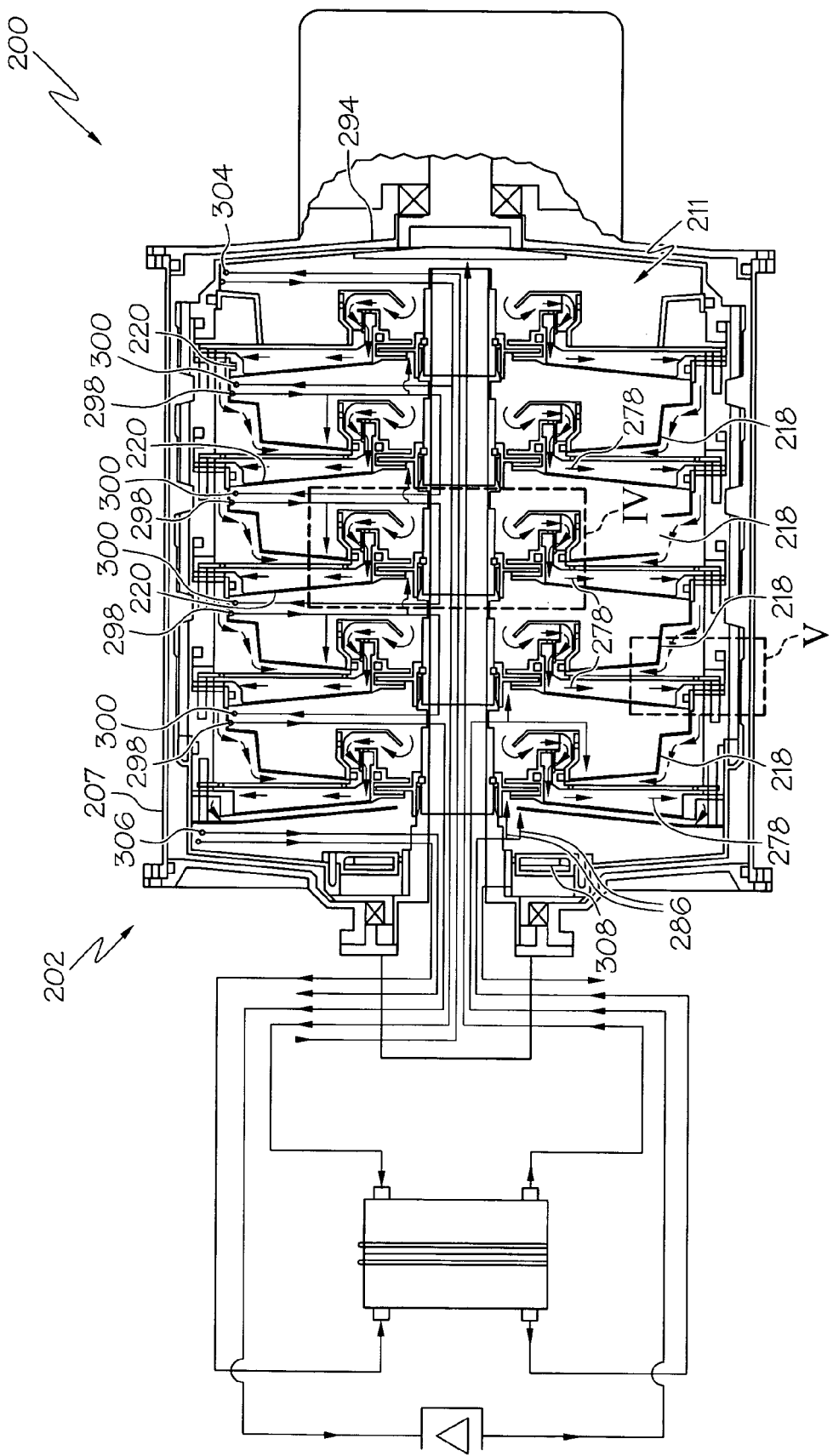
FIG. 3B is a cross-sectional view of a rotary 5-stage vacuum distiller.

A rotary multi-stage distiller 200, also referred to as cascade distiller 200, is shown in greater detail in FIGS. 3A and 3B. Cascade distiller 200 may comprise four major subassemblies. The first subassembly may be a housing 202 where housing 202 comprises a housing front cover 204, a housing rear cover 206, and a cylindrical rotor cover 207. The second subassembly may be a rotor assembly subassembly mounted in housing 202 and supported by bearings 208 and a third subassembly, where the third subassembly may comprise a stationary shaft 209 in the center of the rotor assembly 211. The rotor subassembly may be connected to the fourth subassembly, a drive assembly 210. The rotor subassembly may comprise a front rotor vacuum cover 212 and a rear rotor vacuum cover 214 and a rotor assembly 211. Mounted inside rotor assembly 211 to facilitate the distillation process may be rotor body elements 216, where rotor body elements 216 may be made of a low thermal conduction material, for example, but not limited to, acrylic or Lexan® plastics. Also mounted inside rotor assembly 211 may be a first heat exchange surface 218 and a second heat exchange surface 220. It will be appreciated that first 218 and second 220 heat exchange surfaces may perform the same function as the heat transfer surfaces of the distiller 100 of FIG. 2.

Figure 4:
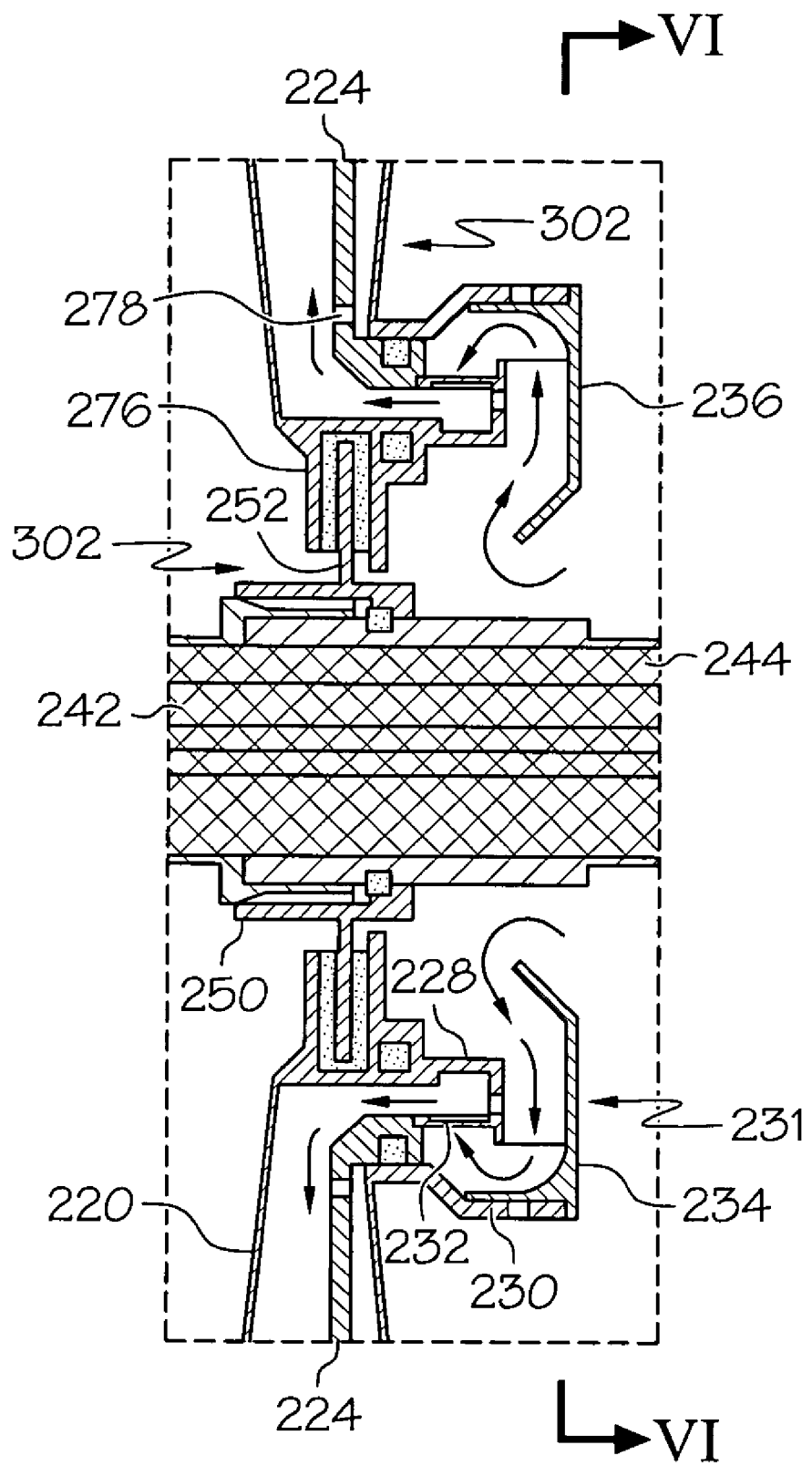
FIG. 4 is an enlarged view of portion IV in FIG. 3, according to the present invention.

Cascade distiller 200 may further comprise a small partition 222, a medium partition 224 and a large partition 226. Small 222, medium 224 and large 226 partitions along with first 218 and second 220 heat exchange surfaces, may form evaporation zones 225, condensation zones 227 and product condensation chamber C 229. Small 222, medium 224 and large 226 partitions may comprise first opening 278 and second opening 280 for discharge of non-condensable gases (FIGS. 3A, 3B and 4). A separator assembly 231 may be located near the center of cylindrical rotor cover and may separate evaporation zones 225 and condensation zones 227, lessening the chance of cross-contamination. The separator assembly 231 may comprise a separator fin assembly 228 with fins 236 mounted inside, a first liquid trap 230, a second liquid trap 232, and a separator assembly cover 234. (See FIGS. 4 and 6). A key component of the separator assembly 231 may be the separator fin assembly 228 shown in FIG. 4 where the fins 236 are indicated and where separator fin assembly may have a convoluted path that may increase the efficiency of separating vapor from condensate. The separator assembly 231 may aid in separating vapor from condensate and remaining wastewater, thereby reducing contamination of the vapor.

Stationary shaft 209 may be located in the center of cascade distiller 200 and may serve as a distribution manifold. Stationary shaft 209 may comprise separate sections comprising a low thermal conductivity material, wherein each section may correspond to a single stage in cascade distiller 200. By way of non-limiting example, the cascade distiller 200 of FIGS. 3A and 3B may comprise five stages and a product condensation chamber 229. Stationary shaft 209 may correspondingly comprise a first shaft section 238 associated with product condensation chamber 229 and a second 240, third 242, fourth 244, fifth 246 and sixth 248 shaft sections which correspond to each of the stages of cascade distiller 200, wherein the stages are arranged sequentially. The shaft sections may each be an individual module which may comprise a section of rotor body element 216, first 218 and second 220 heat exchange surfaces, small 222, medium 224 or large 226 partition, separator assembly 231 and a section of stationary shaft 209. First 276 and second 282 hydraulic seals may be formed when the modules are assembled.

The optimal number of stages, or cascades, of cascade distiller 200 may be derived as a matter of the maximum efficiency of operation under a definite temperature mode by the relationship of equation 1

$$n_{opt} = \frac{T_{max} - T_{min}}{\Delta T_1 + \Delta T_d} \quad (1)$$

Where $n_{opt}$ may be the optimal number of cascades, $T_{max}$ and $T_{min}$ may be the maximum and minimum possible temperatures, respectively, $\Delta T_d$ may be the temperature depression in a stage or cascade, $\Delta T_1$ may be the temperature drop in one cascade, which is further defined by $\Delta T_1 = G_d r/kF_s$ where $G_d$ may be the amount of distillate produced in one cascade, r may be the heat of vaporization of a liquid, k the heat transfer coefficient in a cascade and $F_s$ the heat exchange surface area of a cascade. The temperature values for this equation must be expressed in the same units such as centigrade since $n_{opt}$ is a unitless number. In an exemplary embodiment, cascade distiller 200 may have from about 2 stages to about 15 stages. In another exemplary embodiment, $n_{opt}$ may be about 5-6 for cascade distiller 200 when water regeneration is from urine that may be concentrated up to 500 g/l. Each of the shaft sections 238, 240, 242, 244, 248 may be made of a material with low thermal conductivity and density so that it does not affect the distillation cascade by either adding or withdrawing heat from the system.

Stationary shaft 209 may be assembled by joining the first 238, second 240, third 242, fourth 244, fifth 246 and sixth 248 shaft sections together with retention collars 250. The retention collars 250 may comprise hydraulic seal fins 252 that may be part of the first hydraulic seals 276 (FIG. 4). Passages drilled into these shaft sections may form transportation channels in the assembled stationary shaft 209. The transportation channels may comprise a wastewater fluid feed line 254 for feeding wastewater to cascade distiller 200 and a wastewater fluid circulation loop 256, which may circulate wastewater heated by a thermoelectric heat pump 258. Although a thermoelectric heat pump is used herein as an example, it will be appreciated that other sources of heat and/or cooling may be used such as, but not limited to, waste heat, an electrical heater, a fuel heater, solar heat, refrigeration cooling, evaporative cooling, heat sink cooling, ambient air or sea or lake water cooling, and radiative cooling.

The outlet for wastewater fluid feed line 254 may comprise a first feed Pitot pump 304 where first feed Pitot pump 304 may be located on the periphery of evaporation zone 225 of the first cascade. It will be appreciated that a feed Pitot pump in cascade distiller 200 is the same as a feed Pitot pump for rotary five-stage vacuum distiller 100. The inlet for wastewater fluid circulation loop 256 may be located on the periphery of evaporation zone 225 of the first cascade and may comprise a third pump Pitot pump 292. The inlet is connected with a sixth feed Pitot pump 296 for the second cascade. The outlet for wastewater fluid circulation loop 256 may be located in a central part of evaporation zone 225 of the first cascade may be directed on a rear rotor evaporating surface 294.

Other transportation channels may include a condensation circulation loop 264 which may circulate cooled condensed water between the condensation chamber 229 and the cooling side 262 of thermoelectric heat pump 258. Condensation circulation loop 264 may have an inlet comprising a second Pitot pump 284 for collecting condensate and an outlet for cooled condensate comprising a branch pipe having two spray heads 286, where spray heads 286 may be located near to a central part of a first cooling surface 288 and a second cooling surface 290. Another transportation channel may be a wastewater fluid concentration loop 266 which comprises a salt sensor 268 to monitor the concentration of the wastewater as it is distilled. After the distilled wastewater, or concentrate, reaches pre-determined salinity, it may then be disposed. The distilled wastewater in processed fluid concentration loop 266 may be emptied into the first stage or cascade completing the circulation of distilled wastewater through all of the stages of the cascade distiller 200. Additional transportation channels may be a distillate product effluent line 270 for removing excess condensate from cascade distiller 200, a vacuum line 272 for evacuating air from cascade distiller if desired and for removing non-condensable gases and an inter-cascade distribution line 274 for distributing fluids between the stages of cascade distiller 200. The outlet for distillate product effluent line 270 may be supplied by a sixth Pitot pump 306 and may be located on the periphery of product condensate chamber 229. The inlet of vacuum line 272 may be located in a central part of product condensate chamber 229 for collection of the condensate, or distillate and may be protected with a labyrinth seal 308

Figure 5:
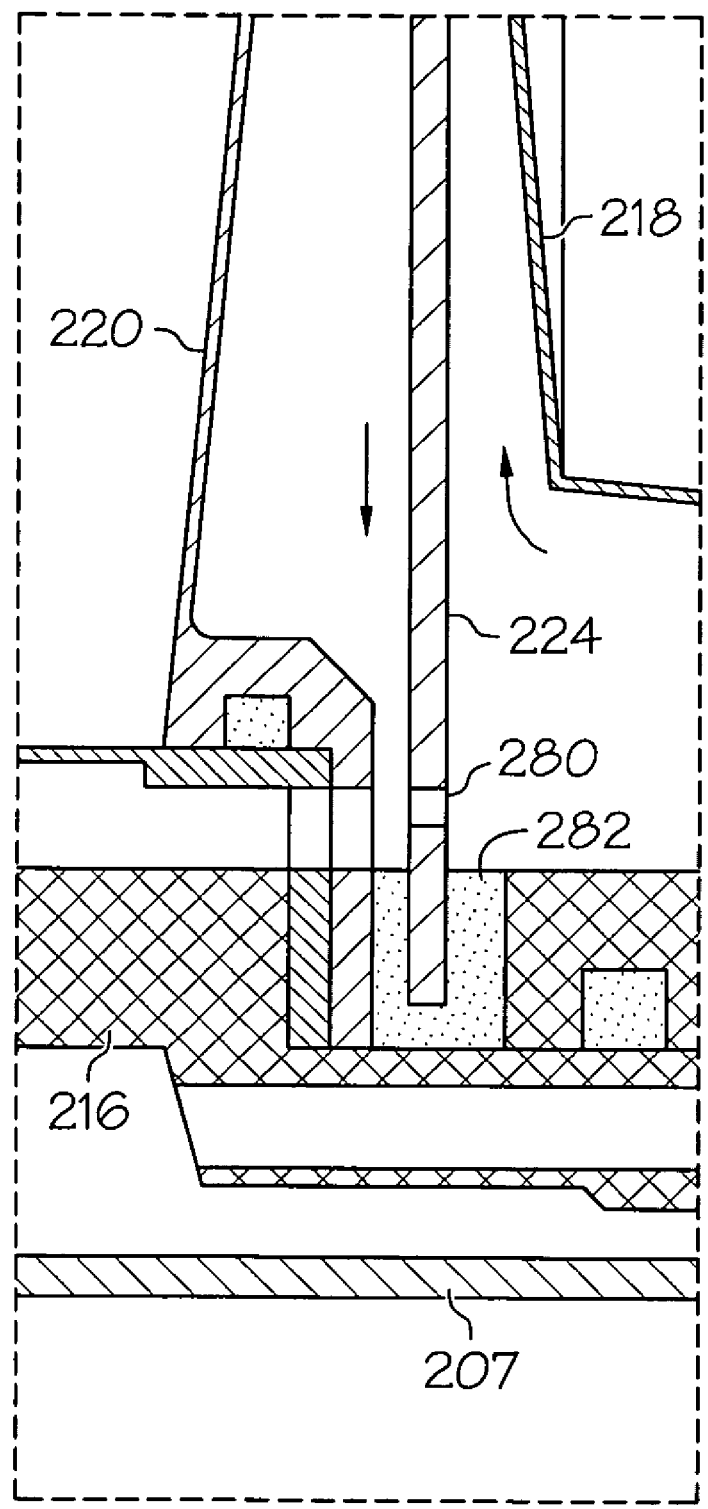
FIG. 5 is an enlarged view of portion V in FIG. 3, according to the present invention.
Figure 6:
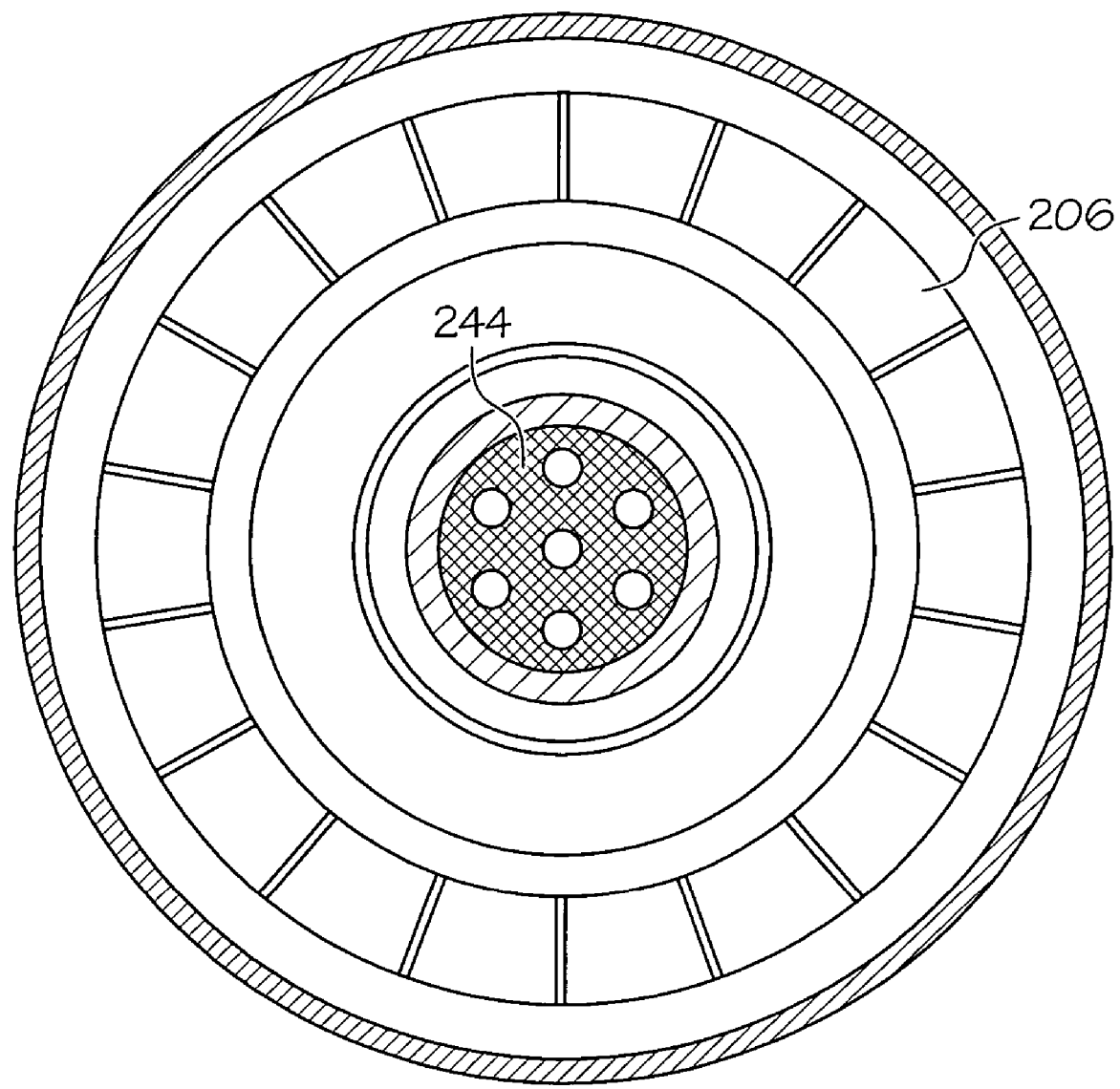
FIG. 6 is a cross-sectional view along the line VI-VI of the portion of the cascade distiller of FIG. 4, according to the present invention.

The individual cascades or stages may be separated from each other in evaporation zones 225 by first hydraulic seals 276 (FIG. 4) and may be connected in sequence by inter-cascade distribution line 274. Inter-cascade distribution line may comprise fourth pump Pitot pump 298 and fifth Pitot feed pump 300, which may provide an output and inlet, respectively, for inter-cascade distribution line 274. The individual cascades or stages may be further separated from each other in condensation zones 227 by small 222, medium 224 and large 226 partitions (FIGS. 3A, 3B and 5). The small 222, medium 224 and large partitions 226 along with rotor body element 216 may form second hydraulic seals 282 (FIG. 5). First 276 and second 282 hydraulic seals may prevent the cross-contamination of the clean water condensate with the wastewater fluid in the cascades. This may be important as each cascade has an increased pressure when compared to the previous cascade. Therefore, cross-contamination may occur due to this pressure difference. It may also occur if the vacuum is released, causing a large pressure change in cascade distiller 200. Even under such conditions, first 276 and second 282 hydraulic seals may prevent cross-contamination.

First 276 hydraulic seals between neighboring cascades may prevent flow of solution with a high concentration of salt to the zones with low concentration of salts while maintaining a pressure difference between the cascades. Second 282 hydraulic seals between neighboring cascades may maintain the pressure difference between cascades while permitting passage of product water through the seals. First 276 and second 282 hydraulic seals may be U-shaped channels filled with fluid (FIGS. 4 and 5). By locating the edge of the liquid section of the hydraulic seal in evaporation zone 225 with higher pressure and lower salt concentration closer to the center of the rotation than the edge of the liquid section of the hydraulic seal location in evaporation zone 225 with lower pressure and higher salt concentration may result in preventing cross-contamination and maintaining pressure difference. First hydraulic seals 276 may be filled with process wastewater from cascade spray heads 302 during operation of cascade distiller 200. Alternatively, first hydraulic seal 276 separating the fifth cascade and product condensation chamber 229 may be flooded with cooling distillate from the spray heads 286. Second hydraulic seals 282 may be filled with distillate. Filling second hydraulic seals 282 with distillate may prevent the leakage of vapor from a cascade with a higher pressure to a cascade with a lower pressure as well as helping to maintain the pressure drop between cascades that is necessary for the operation of cascade distiller 200.

The dimensions of first 276 and second 282 hydraulic seals may be such as to prevent leakage from the hydraulic seals, both during operation and when the rotation of cascade distiller 200 is interrupted or stopped. The dimensions of first 276 and second 282 hydraulic seals may be based on the pressure difference between the cascades separated by the hydraulic seals. Since the pressure decreases from the first cascade to the last cascade, the dimensions of first 276 and second 282 hydraulic seals may differ for each set of hydraulic seals separating individual cascades. The minimum depth of the hydraulic seals may be derived from the required pressure difference between cascades using equation 2:

$$h \geq \frac{\Delta P}{\rho \omega^2 R} \quad (2)$$

where h (m) is the depth of the hydraulic seal, $\Delta P$ (pa) is the pressure drop between cascades, $\rho$(kg/m$^3$) is the density of the wastewater and/or distillate, $\omega$(radians/sec) is the angular velocity of rotation of cylindrical rotor cover 207 and R (m) is the distance from the axis of rotation up to a ridge of a hydraulic seal.

The width of the hydraulic seals located in adjacent evaporation zones 225 and condensation zones 227 may be about the same. The width may be such that fluid in the hydraulic seals remains in the hydraulic seals when rotation of cylindrical rotor cover 207 is stopped. The width may be determined using equation 3:

$$\delta \leq \frac{2\sigma}{5\rho g h} \quad (3)$$

where $\delta$(m) is the width of the hydraulic seals, $\sigma$(N/m) is the surface tension of fluid in the hydraulic seal, $\rho$(kg/m$^3$) is the density of the wastewater and/or distillate, g (m/sec$^2$) is the acceleration of gravity and h (m) is the depth of the hydraulic seal.

A method for regeneration of water from aqueous waste using cascade distiller 200 is also provided by the present invention. Cylindrical rotor cover 207 may be driven in rotation by a drive assembly 210. After cylindrical rotor cover 207 has reached the desired rotational speed, cascade distiller 200 may be evacuated through vacuum line 272, if a vacuum is desired. When the desired vacuum is reached, the wastewater may be directed to the first cascade through wastewater fluid feed line 254. It will be appreciated that when cascade distiller 200 is under vacuum, the pressure of wastewater fluid feed line 254 may be greater than the pressure of the cascade, and therefore no pumping is necessary to move the wastewater into the first cascade. Wastewater may then flow sequentially from the first cascade to the second, third and all subsequent cascades through inter-cascade distribution line 274. As the wastewater is distributed to all the cascades, a ring of fluid may be formed on the periphery of evaporation zones 225. The wastewater may be directed to first 218 and second 220 heat exchange surfaces by cascade spray heads 302. The centrifugal forces may cause the wastewater to fall as a thin film on first 218 and second 220 heat exchange surfaces to the periphery of evaporation zones 225.

The evaporation of the wastewater may begin after heat is supplied to the wastewater by an external heat exchanger or heat pump, such as, but not limited to, thermoelectric heat pump 258. As the heated wastewater flows to the first cascade, the temperature of the wastewater may begin to increase. When the temperature of the wastewater is higher than the saturation temperature of the water vapor, which may be dependent on the pressure of the cascade, the wastewater may boil and evaporate. The vapor formed from evaporation of the wastewater may move in the direction of stationary shaft 209 where the vapor may be separated from the majority of the wastewater fluid as the vapor is lighter, having a lower density. The vapor may be further separated from the fluid by the multiple turns as the vapor passes through a separator assembly 231 as well as the presence of first 230 and second 232 liquid traps and the separator fin assembly 228 (FIG. 4). The separator fin assembly 228 may further separate a two-phase flow by inducing rotational acceleration. The less dense vapor may pass through the fins 236 where as the liquid will contact the fins 236 and become trapped.

After flowing through separator assembly 231, vapor from the first cascade is condensed on the external side of first 218 and second 220 heat exchange surfaces of the second cascade. As the vapor condenses, the heat of condensation may help to heat the internal sides of first 218 and second 220 heat exchange surfaces to increase the temperature of the surface, and hence the vaporization of wastewater in the second cascade. The vapor from the second cascade may then move to the third cascade in a similar manner to the movement of vapor from the first to the second cascades. The cycle of evaporation-condensation may continue through all cascades of cascade distiller 200. It will be appreciated that most of the heat of vaporization required for evaporation in the first cascade may be recovered in the subsequent condensation. This heat recovery may enable the production of condensate/distillate at a fraction of the normal latent heat required to evaporate the water. The fraction of the latent heat of vaporization may be approximately equal to the number of stages. Thus, by way of non-limiting example, a five stage cascade distiller 200 may use only 20% of the power of a conventional distiller.

In the last cascade, the vapor may be condensed on both sides of first 288 and second 290 cooling surfaces after passing through separator assembly 231 from the prior cascade. First 288 and second 290 cooling surfaces may be cooled by condensate pumped through condensation circulation loop 264 between first 288 and second 290 cooling surfaces and the cooling side 262 of thermoelectric heat pump 258. The result may be that the majority of the vapor is condensed at immediate contact with first 288 and second 290 cooling surfaces.

The remaining, non-condensing gases may be removed from condensation zones 227 through first 278 and second 280 openings for non-condensing gas discharge found in small 222, medium 224 and large 226 partitions (FIG. 4).

First 278 opening for non-condensing gas discharge may be found close to the axis of rotation of cylindrical rotor 211 to remove low molecular weight gases such as, but not limited to, ammonia since they have lower density as compared to water vapor. Second opening 280 may be located at the periphery of cylindrical rotor 211 to remove higher molecular weight gases such as, but not limited to, nitrogen and oxygen since they have a higher density than water vapor. The non-condensing gases may then be removed through vacuum line 272. A labyrinth seal 308 may be provided to insure that no distillate liquid will enter the vacuum line.

In the first cascade, where the vapor pressure may be maximal, first feed 304 and third pump 292 Pitot pumps, located on the periphery of cylindrical rotor cover 207, may be circulating a part of the wastewater fluid along wastewater fluid circulation loop 256 through the heating side 260 of thermoelectric heat pump 258. The wastewater fluid may be preheated to a temperature greater than saturation temperature under the vapor pressure of the first cascade. After passing through thermoelectric heat pump 258, the heated wastewater may be returned to rear rotor evaporating surface 294, where there may be partial self-evaporation. Fresh wastewater is may also be constantly supplied to the first cascade by wastewater fluid feed line 254 and, when mixing with the wastewater fluid from the wastewater fluid circulation loop 256, may result in slowing the rate of concentration of wastewater process fluid.

The supply of wastewater in cascade distiller 200 may be automatically regulated by an external valve which may open when the level of wastewater process fluid in the first cascade decreases due to distillation and exposes the first feed Pitot pump 304 to the low pressure of the vapor. When the cascade is filled, the first feed Pitot pump 304 may be in contact with the rotating liquid and may experience relatively high Pitotostatic pressure. When the volume of wastewater process fluid decreases in the cascade distiller 200, the first feed Pitot pump 304 may become exposed to only vapor and may experience low Pitotostatic pressure. The external valve is adjusted to open when the low Pitotostatic pressure is present and close when the high Pitotostatic pressure is present thus providing automatic filling of the cascade distiller 200.

It will be appreciated that the wastewater process fluid level control in the other stages of the cascade, i.e. the second through fifth cascade, may use the same principle of Pitotostatic pressures. In the cascades the fifth and seventh feed Pitot pumps 300, 296 and the fourth pump Pitot pump 298 may be located at different radial positions. The fourth pump Pitot pumps 298 may be located at a greater radial distance from the axis of rotation of cylindrical rotor 211 than the fifth and seventh feed Pitot pumps 300, 296 thus providing higher pressure for the circulating liquid. There may be pressure losses in the transport circuit 274 and the relative location and relative pressures of the fourth pump Pitot pump 298 and fifth and seventh feed Pitot pumps 300, 296 may be arranged such that when the level of wastewater process fluid in the subsequent cascade i.e. stage 3 when transferring from stage 2, covers the fifth and seventh feed Pitot pumps 300, 296, the pressure balances and no further fluid is transferred. When the level of fluid is reduced due to distillation or transfer of fluid, the fifth feed Pitot pump 300 may be exposed to low pressure vapor and fluid may be transferred by the fourth pump Pitot pump 298 until the pressure is restored by increasing fluid level. Thus, all of the stages of the cascade may have passive automatic liquid level control. This may be a critical function for the cascade distiller 200 as this design feature may prevent liquid from accumulating in any single cascade, flooding the cascade, and ultimately causing a failure of operation.

The concentration of salts in the wastewater may occur sequentially in the subsequent cascades, i.e. the second through fifth cascades in the exemplary embodiment of the present invention. In the last cascade, the wastewater may be captured on the periphery of cylindrical rotor cover 207 and may be circulated through processed fluid concentration loop 266 and salt sensor 268. When the salinity of the processed fluid reaches a pre-determined level, the condensed wastewater may be removed. It may then be sent to the first stage completing the circulation of processed fluid through all of the cascades.

The condensate formed in condensation zones 227 of all cascades may, under centrifugal force, flow down along first 218 and second 220 heat exchange surfaces and then from cascade to cascade through second hydraulic seals 282 to product condensation chamber 229. As the condensate moves from a cascade of higher vapor pressure (i.e. first cascade) to a cascade with a lower vapor pressure (i.e. second cascade), there may be partial evaporation of the condensate, which may then in turn be condensed along first 218 and second 220 heat exchange surfaces. The heat of evaporation obtained from the self-evaporation of the condensate provides additional heat for vaporization of wastewater in the cascade.

The condensate may move sequentially from cascade to cascade, gaining volume until it reaches product condensation chamber 229. Product condensation chamber 229 may comprise two different sets of Pitot pumps. Second Pitot pump 284 may have a large radius for pumping the condensate externally to the cooling side 262 of thermoelectric heat pump 258 through condensation circulation loop 264. Condensate in product condensation chamber 229 may be forced by centrifugal forces to the outer periphery and second Pitot pump 284 may be positioned near the outer periphery at a shallow depth so that condensate may always be accessible to second Pitot pump 284. In contrast, a sixth Pitot pump 306 for removing excess condensate from product condensation chamber 229 may have a smaller radius and may be situated at a normal maximum depth of the condensate. In an illustrative embodiment, the radius of sixth Pitot pump 306 is from about 90% to about 98% of the radius of second Pitot pump 284. When the condensate reaches the depth of sixth Pitot pump 306, the excess condensate may flood the opening of sixth Pitot pump 306, which then may pump the excess condensate through distillate product effluent line 270 to an external reservoir.

It should be understood, of course, that the foregoing relates to exemplary embodiments of the invention and that modifications may be made without departing from the spirit and scope of the invention as set forth in the following claims.

We claim:

1. A multi-stage vacuum cascade distiller comprising:
   a housing;
   a cylindrical rotor cover disposed within the housing, the cylindrical rotor cover comprising an axis of rotation;
   a stationary shaft disposed within the cylindrical rotor cover, the stationary shaft comprising individual removable shaft sections wherein each shaft section comprises a stage of the multi-stage vacuum distiller;
   wherein each stage comprises heat exchange surfaces, partitions, an evaporation zone and a condensation zone;
   each of said partitions comprises a first opening proximate said stationary shaft and a second opening proximate said housing; and
   said first and said second openings being configured to discharge non-condensable gases.

2. The cascade distiller of claim 1 further comprising transportation channels in the stationary shaft, wherein the transportation channels comprise passages drilled into the stationary shaft.

3. The cascade distiller of claim 2 wherein the transportation channels comprise a wastewater fluid feed line, a wastewater fluid circulation loop, a condensation circulation loop, a processed fluid concentration loop, a distillate product effluent line, a vacuum line, an inter-cascade distribution line or any combination thereof.

4. The cascade distiller of claim 1 wherein the number of shaft sections is equal to the number of stages and wherein the number of stages is determined by the equation $$n_{opt} = \frac{T_{max} - T_{min}}{\Delta T_1 + \Delta T_d}$$

where $n_{opt}$ is the optimal number of cascades, $T_{max}$ and $T_{min}$ are the maximum and minimum possible temperatures, respectively, $\Delta T_d$ is the temperature depression in a stage or cascade, $\Delta T_1$ is the temperature drop in one cascade, which is further defined by $T_1 = G_d r/kF_s$ where $G_d$ is the amount of distillate produced in one cascade, r is the heat of vaporization of a liquid, k the heat transfer coefficient in a cascade and $F_s$ the heat exchange surface of a cascade.

5. The cascade distiller of claim 1 wherein the number of stages is from about 2 to about 15.

6. The cascade distiller of claim 1 wherein assembly of the shaft sections to form the stationary shaft forms hydraulic seals between the stages.

7. The cascade distiller of claim 1 further comprising a plurality of Pitot pumps, the plurality of Pitot pumps being disposed uniformly on the periphery of the cylindrical rotor cover.

8. The cascade distiller of claim 7 wherein the plurality of Pitot pumps comprises:
a feed Pitot pump in each stage of the cascade distiller;
a pump Pitot pump in each stage of the cascade distiller, wherein the pump Pitot pump is located at a greater radial distance from the axis of rotation of the cylindrical rotor cover than the feed Pitot pump; and
wherein the feed Pitot pump and the pump Pitot pump control fluid levels in each stage.

9. The cascade distiller of claim 8 wherein the feed Pitot pump of the first stage is controlled by an external valve wherein the external valve is open when the first feed Pitot pump experiences low Pitotostatic pressure in the first stage and closed when the feed Pitot pump experiences high Pitotostatic pressure in the first stage.

10. The cascade distiller of claim 1 wherein each shaft section comprises a part of a rotor body element, heat exchange surfaces, a partition, and a separator assembly.

11. The cascade distiller of claim 1 wherein each stage further comprises:
the first opening and the second opening are disposed by the axis of rotation of the cylindrical rotor cover; and
a vacuum line, the vacuum line being in communication between a vacuum pump and the cascade distiller and where non-condensing gases are removed from the cascade distiller through the first opening, second opening and the vacuum line.

12. The cascade distiller of claim 1 further comprising:
at least one hydraulic seal between two adjoining stages, wherein the hydraulic seal comprises a fluid.

13. The cascade distiller of claim 12 wherein the hydraulic seal comprises a depth, wherein the depth is determined from the equation $$h \geq \frac{\Delta P}{\rho \omega^2 R}$$

where h is the depth of the hydraulic seal, $\Delta P$ is the pressure drop between cascades, $\rho$ is the density of the fluid, $\omega$ is the angular velocity of rotation of the cylindrical rotor cover and R is the distance from the axis of rotation of said cylindrical rotor cover up to a nearest ridge of the hydraulic seal.

14. The cascade distiller of claim 13 wherein the hydraulic seal further comprises a width, wherein the width is determined by the equation $$\delta \leq \frac{2\sigma}{5\rho g h}$$

where $\delta$ is the width, $\sigma$ is the surface tension of the liquid, g is gravity and h is the depth of the hydraulic seal.

15. The cascade distiller of claim 12 wherein the cascade distiller comprises two hydraulic seals, wherein one hydraulic seal located on an evaporation zone and the other hydraulic seal is located on a condensation zone.

16. The cascade distiller of claim 12 wherein the cascade distiller is operated under vacuum, microgravity, atmospheric pressure or overpressure.

17. The cascade distiller of claim 12 wherein the cascade stages are arranged sequentially within the cylindrical rotor cover and wherein a first cascade stage has the highest pressure and a last cascade stage has the lowest pressure.

18. The cascade distiller of claim 12 wherein the cascade stages further comprise a separator assembly, wherein the separator assembly is located by the center of the cylindrical rotor cover.

19. The cascade distiller of claim 18 wherein the separator assembly comprises at least two liquid traps and a separator fin assembly comprising radial fins and wherein the separator fin assembly comprises a convoluted path.

20. The cascade distiller of claim 19 wherein the fluid is condensate.

21. The cascade distiller of claim 1 further comprising:
a first cascade stage and a last cascade stage, wherein neighboring cascade stages are in fluid communication; and
a product condensation chamber, the product condensation chamber being in fluid communication with the last cascade stage, wherein the product condensation chamber comprises a first Pitot pump for pumping a condensate from the product condensation chamber to a condensation circulation loop and a second Pitot pump for pumping excess condensate to a distillate product effluent line.

22. The cascade distiller of claim 21 wherein the first Pitot pump is disposed near an outer wall of the cylindrical rotor cover and at a shallow depth.

23. The cascade distiller of claim 21 wherein the second Pitot pump has a smaller radius than the first Pitot pump and wherein the second Pitot pump is disposed at a maximum depth for the condensate in the product condensation chamber.

24. The cascade distiller of claim 21 wherein the condensation circulation loop is in fluid communication with a cooling side of a heat pump.

25. The cascade distiller of claim 21 wherein the radius of the second Pitot pump is from about 90% to about 98% of the radius of the first Pitot pump.

* * * * *

UNITED STATES PATENT AND TRADEMARK OFFICE
CERTIFICATE OF CORRECTION

PATENT NO. : 7,610,768 B2  Page 1 of 1
APPLICATION NO. : 11/271674
DATED : November 3, 2009
INVENTOR(S) : Lubman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twelfth Day of October, 2010

David J. Kappos
*Director of the United States Patent and Trademark Office*